YIG TUNED GALLIUM ARSENIDE-LIMITED SPACE CHARGE ACCUMULATION DIODE OSCILLATOR

Filed Nov. 22, 1968 2 Sheets-Sheet 1

INVENTOR
Walter E. Venator, Jr.
By Ronald M. Goldman
ATTORNEY

INVENTOR
Walter E. Venator, Jr.
By Ronald M. Goldman
ATTORNEY

United States Patent Office 3,544,918

Patented Dec. 1, 1970

3,544,918

YIG TUNED GALLIUM ARSENIDE-LIMITED SPACE CHARGE ACCUMULATION DIODE OSCILLATOR

Walter E. Venator, Jr., Riveredge, N.J., assignor to Litton Precision Products, Inc., San Carlos, Calif., a corporation of Delaware Filed Nov. 22, 1968, Ser. No. 778,038

Int. Cl. H03b *7/14*

U.S. Cl. 331—107 12 Claims

ABSTRACT OF THE DISCLOSURE

In the oscillator of the present invention a gallium arsenide LSA breakdown diode is provided to generate high frequency microwave energy. Gyromagnetic material, suitably a single crystal yttrium iron garnet sphere (YIG), is electromagnetically coupled to the output of the LSA diode and functions as the frequency determining element of the oscillator. A waveguide dimensioned to be beyond cutoff in the frequency range to which the gyromagnetic material is tuned and which is termed a waveguide cutoff section is coupled to the YIG sphere. The waveguide cutoff section is coupled to receive microwave energy as gyroscopically modified by the YIG sphere and passes the microwave field only of the frequency to which the YIG sphere is tuned to a resistive load coupled to the other end of the cutoff section. An electromagnet provides the magnetic field for biasing the YIG sphere for resonance at any particular frequency. Additionally, a second YIG sphere subject to the same magnetic fields as the first sphere is coupled in the output end of the waveguide cutoff section for modifying the electromagnetic field passing therethrough prior to being coupled to a resistive load.

This invention relates to tunable microwave oscillators; and, more particularly, to a YIG tuned LSA diode oscillator.

The limited space charge accumulation (LSA) diode, suitably fabricated of gallium arsenide, has heretofore been developed and used as a source of high frequency microwave energy. As described in the literature, the LSA diode, when properly biased with a DC potential from a source of DC pulses, "breaks down" and generates a spectrum of high frequency electromagnetic radiation in the ultra high (UHF) or microwave frequency region. In addition to generating UHF energy at a desired frequency, many extraneous frequencies appear in that spectrum. For the LSA breakdown diode to be of use as an oscillator in communication systems, requiring a single frequency source tunable over a range of frequencies, the undesired portions of the microwave spectrum simultaneously generated thereby must be eliminated or reduced. The oscillator output signal must be of high spectral purity. Conventionally, to accomplish this purpose, somewhat at best, the LSA diode is placed in a resonant cavity; i.e., a container bounded by conductive walls, which by its dimensions has a dominant frequency of resonance. The output signals are taken from the cavity and coupled to a suitable load by means of either a capacitive probe or a coupling loop. By enhancing the desired frequency in this manner a useful signal relative to the others spuriously generated or noise is obtained. Tuning or changing the frequency of such an oscillator is accomplished by the conventional expedient of mechanically tuning the resonant cavity.

As is apparent, the oscillator structure described does not eliminate many of the problems cited that are associated with microwave oscillators of the LSA diode type. First, some of those frequencies in the undesired part of the spectrum generated by the LSA diode are not eliminated by the tuned cavity and are accordingly coupled out of the cavity and, hence, to the load. Since the load includes or is connected with the remaining portions of the communications system, extraneous and interfering signals continue to exist and pose serious interference problems. Accordingly, various filter circuits are provided in the load circuit in present systems to eliminate such undesired signals. In addition to the obvious disadvantages of providing extra components, such as filters in such systems, the filtering networks inherently reduce the amplitude of the desired signal.

Secondly, signals that originate in other parts of the communications system can be coupled into the oscillator cavity of this type of oscillator via the output coupling circuit. When introduced into the oscillator cavity, these extraneous signals influence the operation of the LSA breakdown diode by distorting the resonant frequency of the cavity, thus causing the diode to operate in an undesired mode. This may synchronize the oscillator into operation at spurious frequency and, may undesirably increase the VSWR of the load presented to the microwave source. Thus, with this type of oscillator, additional microwave filters are needed to isolate the oscillator from any such extraneous signals that may be transmitted from the load.

Accordingly, it is an object of the invention to provide a microwave oscillator of the LSA breakdown diode type that generates an output signal of improved spectral purity without external filters.

It is another object of the invention to provide a novel filter adapted for an oscillator.

It is a still further object of the invention to reduce the generation of spurious signals and provide out of band isolation between the LSA diode of the microwave oscillator and the load.

It is as additional object of the invention to provide an electronically tunable LSA diode microwave source with improved isolation between the diode and the output coupling loop in which the generation of spurious frequencies is substantially reduced.

In accordance with the foregoing objects a gallium arsenide LSA diode is provided to generate high frequency microwave energy. Gyromagnetic material, suitably a single crystal yttrium iron garnet sphere (YIG) is electromagnetically coupled to the output of the LSA diode, resonates, and functions as the frequency determining element of the oscillator. In addition, a waveguide, termed a waveguide cutoff section, dimensioned to be beyond cutoff for the frequency to which the gyromagnetic material is resonant, is provided. The waveguide cutoff section is coupled to receive microwave energy as gyroscopically modified by the gyromagnetic material and passes that microwave energy of only the frequency to which the gyromagnetic material is resonant therethrough to a resistive load. This provides a filter. A magnetic field, suitably generated by an electromagnet magnetically biases the gyromagnetic material. The frequency of resonance of the gyromagnetic material and, hence, the frequency of the oscillator output, is varied to different frequencies by simply varying the intensity of the current through the coil winding of the electromagnet, hence, the intensity of the magnetic field applied to the YIG resonators.

In accordance with another aspect of my invention, a second sphere of gyromagnetic material is biased by the same intensity magnetic field as that applied to the first gyromagnetic body and is coupled at the output end of the waveguide cutoff section to gyroscopically modify the microwave field from the waveguide prior to coupling that microwave energy to a load.

The foregoing and other advantages and features which are believed to be characteristic of the invention both as to its organization and method of operation together with further objects and advantages thereof are better understood from the following description considered in connection with the accompanying drawings in which several embodiments of the invention have been illustrated by way of example.

In the drawings:

FIG. 1 schematically illustrates one embodiment of the microwave oscillator of the invention;

Figure 1:
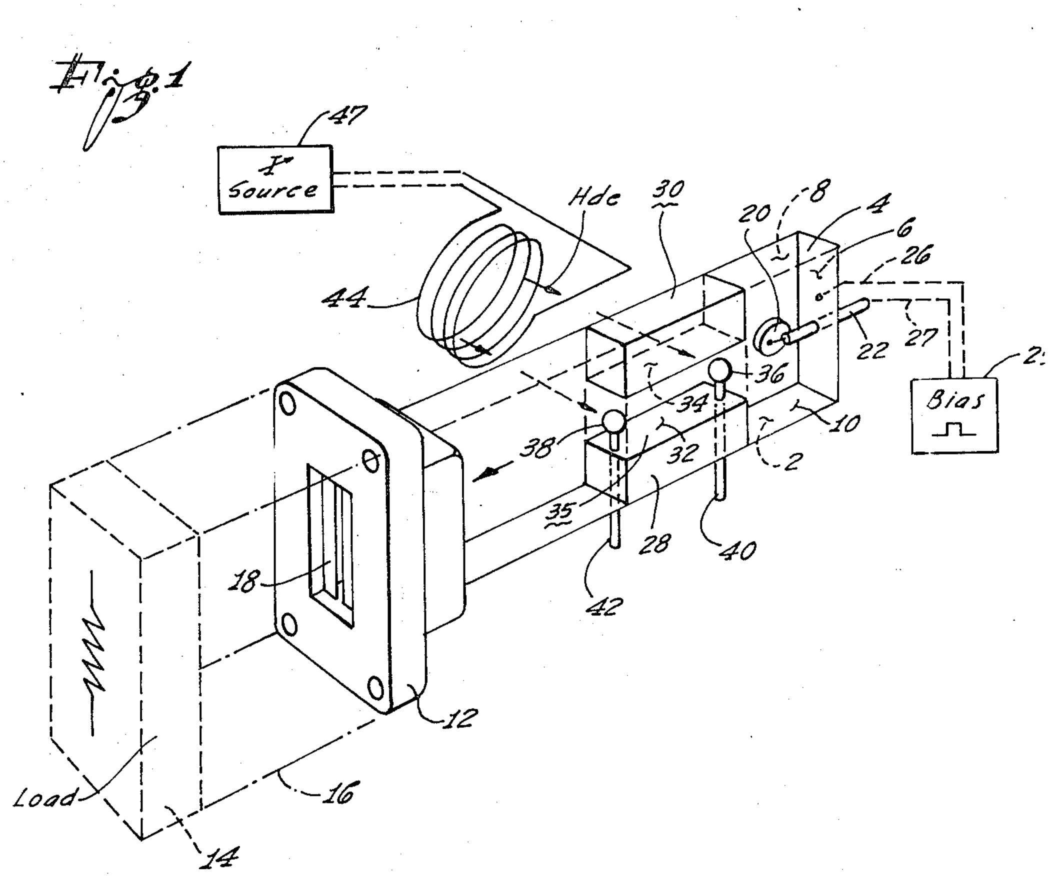

The oscillator illustrated in FIG. 1 is designed to couple its output to a waveguide transmission line and, hence, is termed the waveguide model. As becomes apparent, to provide a clear illustration of the elements the dimensions in FIG. 1 are exaggerated. A waveguide like container includes bottom and top walls 2 and 4, a side wall 6, a back wall 8, and a front wall 10 all of electrically conductive material. For purposes of better illustrating the invention, front wall 10 and top wall 4 are treated as transparent as indicated by the dashed outline. Each of the container walls is of conductive material, such as copper, which in addition is plated internally with silver to reduce electrical losses in the same manner as is conventional with rigid waveguide. A waveguide flange 12 is coupled to the output end of the waveguide like container illustrated in the figure. The flange is of conventional construction for coupling the electromagnetic fields originating in the container to a waveguide transmission line symbolically represented by dashed lines 16. The waveguide is in turn shown connected to an electrically resistive load, symbolically illustrated as 14.

Internal of flange 12 is included an RF impedance transformer 18 which, as is conventional, transforms the low output impedance effectively appearing at the container to a higher impedance suitable for connection to waveguide transmission line 16 and load 14. The construction of the RF transformer 18 is conventional and is not explained further. Mounted within the container is a conventional LSA gallium arsenide diode 20. The diode has its two major opposed surfaces metalized and is mounted with one of those surfaces in contact with wall 8. This provides heat sinking for the diode. An insulator 22 protrudes through wall 6 of the container. An electrical lead 27 extends from the outer metalized surface of diode 20 through insulator 22 to the exterior of the container for connection to a conventional source of DC bias pulses, illustrated symbolically by 29. A second lead 26 from bias source 29 is connected to conductive wall 6 which completes the circuit through the container walls to the terminal of diode 20 that contacts wall 8. The details of mounting, electrical connections, and physical configuration of breakdown diode 20 is suitably of any conventional construction and need not be illustrated or discussed in greater detail. However mounted, the distance between diode 20 and wall 6 is preferably less than ½ wavelength at the center frequency of which the oscillator is designed to operate and is as small a distance as possible.

Mounted within the container are two spaced blocks of conductive material 28 and 30. These blocks fit between and within container walls 8 and 10 and are approximately aligned one over the other to define a space therebetween. The boundaries of the space between the conductive rectangular blocks 28 and 30 are further defined by those portions of conductive walls 8 and 10 which bound the space on the front and back sides. Accordingly, the upper face 32 of black 28 and lower face 34 of block 30 together with those portions of walls 8 and 10 define a waveguide passage 35, termed the waveguide cutoff section of suitable width, heighth, and length dimensions as hereinafter more fully discussed. While 28 and 30 are illustrated as blocks, it is apparent that they provide only boundary walls; and hence, if desired, need only be of thin sheet to form such a wall 34 or 32.

The dimensions of the waveguide cutoff section 35 are such as to make the formed waveguide "below cutoff" in the range of frequencies which the oscillator is designed to generate. A sphere 36 of the gyromagnetic material, single crystal yttrium iron garnet (YIG) material, is located at the input end of waveguide cutoff section 35. A second sphere 38 of the gyromagnetic material also suitably YIG is located at the output end of the waveguide cutoff section.

YIG spheres 36 and 38 are mounted in their respective positions between walls 32 and 34 by insulator rods 40 and 42, respectively, which extend into the container and through block 28. The rods are longitudinally and rotationally positionable. These rods permit the vertical adjustment of the position as well as orientation of crystal axes with respect to the DC magnetic field of YIG spheres 36 and 38. The inclusion of the rods insures a common resonant frequency for both spheres. Preferably the distance between YIG sphere 36 and LSA diode 20 is on the order of ¼ wavelength in the waveguide of the center frequency in the range of frequencies that the oscillator is designed to operate. An electromagnetic coil 44 is provided and oriented so that, in response to current, a DC magnetic field, symbolically represented as $H_{dc}$, is generated and applied to YIG spheres 36 and 38. This magnetic field is oriented so that it is perpendicular to back wall 8. As a rule of thumb such orientation is the same as that required for proper operation of the YIG spheres. Coil 44 is connected to a conventional controlled source of DC electrical current which is represented by 47. Such source is conventionally providing the control to adjust or modulate the level of current which flows through the electromagnet coil 44. Spheres 36 and 38 are thus subjected to the same intensity of magnetic field H. It is also conventional for the coil 44 to be wound around an armature, a loop of ferromagnetic material in the form of a U shape with ends forming pole pieces facing each other on opposite sides of the YIG spheres and contacting walls 8 and 10. Such is a preferred physical construction for the electromagnet and is illustrated in FIG. 2.

Figure 2:
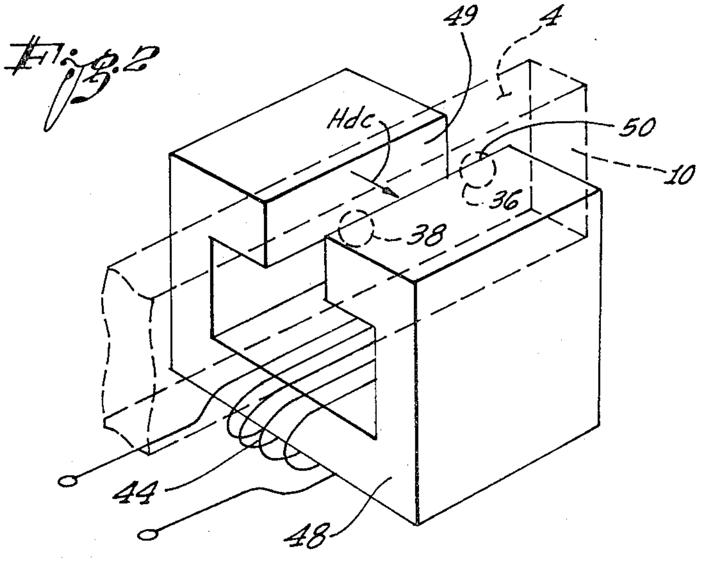
FIG. 2 illustrates a preferred construction for an electromagnet used in the embodiment of FIG. 1.

Diverging briefly, FIG. 2 contains an armature 48 with pole piece faces 49 and 50 abutting the front and back walls of the container. Electrical coil 44 is wound about armature 48. The YIG spheres 36 and 38 are situated in the container of FIG. 1 between pole piece faces 49 and 50.

Reference is made to LSA diode 20 and YIG sphere 36. The gallium arsenide LSA breakdown diode is a conventional device which generates microwave energy of a spectrum of frequencies when biased with a suitable source of DC pulses. However, to provide an oscillator with an output at single desired frequency, the diode must be coupled to a resonant circuit. As is known, the gyromagnetic sphere, here YIG sphere 36, is suitably polarized with a magnetic field that effectively provides a resonant circuit. Moreover, the LSA diode 20 maintains such oscillations only when it is coupled in addition to a resistive load. Neglecting the anisotropic effects of the YIG sphere, the resonant frequency, $f_r$, of a YIG sphere subjected to an applied DC magnetic field, $H_{dc}$, is expressed as being approximately equal to $\gamma$ multiplied by $H_{dc}$; where $f_r$ is the resonant frequency expressed in megahertz, $\gamma$ is the gyromagnetic ratio of the material for which YIG equals 2.8 megahertz per oersted and $H_{dc}$ is the applied magnetic field expressed in oersteds. Thus, as the current level in coil 44 is varied, the produced intensity of the magnetic field, is varied and this as a function of the foregoing the resonant frequency of the YIG sphere 36 to which diode 20 is electro-magnetically coupled.

Reference is again made to waveguide cutoff section 35 formed between faces 32 and 34 of conductive blocks 28 and 30 and back and front walls 8 and 10 of the container in FIG. 1. This section 35 provides a passage for signals from the sphere 36 in front to sphere 38 in the rear of the container. This "waveguide" is designed to be beyond cutoff for the range of frequencies for which it is desired to be generated and coupled to load 14. Reference to any standard text on microwave waveguide transmission lines defines the term "cutoff" as that frequency below which a simple waveguide cannot transmit or propagate through electromagnetic energy and such electromagnetic energy as is introduced is simply attenuated. As mathematically derived in the texts, the cutoff frequency is a function of the geometry and dimensions of the waveguide. While the inclusion of a waveguide cutoff section seems inconsistent with the purpose herein expressed of passing through the waveguide cutoff section microwave energy of a frequency lower than that of the cutoff frequency, which would ordinarily be attenuated, the reversal of this "cutoff" phenomenon due to the inclusion of ferrite or YIG spheres is more apparent from the following discussion.

As mathematically derived in the standard texts on the subject, the general expression for the cutoff frequency of a rectangular waveguide for the $TM_{mn}$ (transverse magnetic) mode is given by the equation $$f_c=\frac{1}{2\pi\sqrt{\mu\epsilon}}\sqrt{\left(\frac{m\pi}{a}\right)^2+\left(\frac{n\pi}{b}\right)^2}$$

where $m$, $n$ are integers $a$, $b$ are the width and heights, respectively, of the waveguide, $\mu$ is the permeability of propagating medium, and $\epsilon$ is dielectric permittivity of medium. The lowest or TM mode sustainable in a waveguide is where $m, n=1$ and is the $TM_{11}$ mode. Accordingly, the lowest cutoff frequency for the $TM_{11}$ mode is related to the width and heighth dimensions of the waveguide $$\text{by } f_c=\frac{c}{2a}\,\frac{\sqrt{1+\left(\frac{a}{b}\right)^2}}{2a}$$

where $c$=speed of light. For the $TE_{mn}$ modes the equation relating to the cutoff frequency for the $TE_{mn}$ mode in terms of the width and heighth dimensions of the guide is:

$$f_c=c\,\frac{\sqrt{1+\left(\frac{a}{2b}\right)^2}}{a}$$

The lowest order transverse electric mode sustainable by a rectangular waveguide is the $TE_{10}$ mode. This is the basic or dominant mode generally selected for microwave communications purposes. The cutoff frequency for this mode in terms of the width and heighth of the guide reduces to $$\frac{c}{2a}\sqrt{m^2+n^2+\left(\frac{a}{b}\right)^2}$$

$$=f_c=\frac{c}{2a};\ \lambda_c=2a$$

It is thus apparent that the cutoff frequency for the $TE_{10}$ mode is independent of the heighth dimension, ($b$), of the waveguide and dependent solely on the width dimension. Also, the cutoff frequency for the $TE_{10}$ mode is below that of any other cutoff frequency for any other TE mode, and in addition below that of any TM mode.

The attenuation of this cutoff section can be expressed by means of the equation $$L=60\left(\frac{l}{a}\right)db$$

where L is the attenuation in decibels, $l$ is the length of the cutoff section, and $a$ represents the $a$ dimension of the waveguide. This equation holds when the dimension $a$ is substantially smaller than $(\frac{1}{5})\lambda$. Additionally the length of the waveguide cutoff section is dependent upon the degree of the isolation required and by the center to center separation of spheres 36 and 38. This in turn governs the bandwidth of the tunable filter.

Coupling of energy between the two spheres in the cutoff waveguide is theoretically explained by considering the ferromagnetic spheres, such as 36 and 38, to be isotropic dipoles which resonate at frequency $\omega$, a function of the strength of the magnetic field biasing the spheres. Sphere 36 which is located adjacent the diode 20 acts as a dipole antenna and receives energy from the diode. Sphere 38 functions as a dipole receiving antenna and receives its energy from that transmitted from sphere 36. Thus, the electromagnetic field radiating from the diode is coupled to the two YIG spheres.

The center to center separation of the spheres is determined in accordance with the following equation:

$$K_r\cdot\text{mHz.}=5.32\times10^{-2}\left(\frac{ds}{r}\right)\omega_m$$

where K is the coupling bandwidth in megahertz, $ds$ is the sphere diameter in inches, $r$ is the center to center separation of spheres expressed in inches, and $\omega_m$ is equal to $\gamma 4\pi M_s$. In turn $\gamma$ represents the gyromagnetic ratio for the gyromagnetic material, which for YIG is 2.8 mHz./oe. The quantity $4\pi M_s$ is the saturation magnetization of the material expressed in oersteds which is YIG is approximately 1750 oersteds.

The losses between spheres and the bandwidth of the filter is a function of the separation between the centers of spheres 36 and the quantity $4\pi M_s$. Accordingly, as the sphere centers are brought closer more magnetic coupling is obtained and this results in a wider bandwidth for a given quantity $4\pi M_s$. In addition, if the quantity $4\pi M_s$ is increased and the center to center separation of YIG spheres 36 and 38 is maintained constant, the bandwidth increases since a greater magnetic field is available.

Like any magnetic field, the intensity of the field decreases with the distance between the elements and between the YIG spheres it is an inverse function of the cube of the separation distance. Treating the sphere as individually tuned circuits the construction of a filter with a specified bandwidth becomes a mere matter of computing the separation between spheres.

By way of example a design for the oscillator of the invention provides output signals tunable over a range of 12 to 18 gigahertz. Accordingly, the cutoff frequency of section 35 is designed to be higher and by way of example is on the order of 20 gigahertz. Accordingly, the dimensions of a waveguide cutoff section are suitably derived from the standard waveguide equations. Further, assuming the waveguide cutoff section is required to exhibit two pole responses with an instantaneous 3 db bandwidth of 20 megahertz, the following factors may be derived. For such interstage coupling coefficient for a two pole filter is .707. Expressed in other terms, the coupling bandwidth is .707×(20) or 14 megahertz.

Selecting a .050 inch diameter sphere and with a 1750 gauss material ($4\pi M_s$), such as YIG, the equation for sphere separation reduced to $r\div ds=2.6$. Substituting .050 inch for $ds$ in the equation results in a solution for $r$, the sepaartion distance, of .130 inch. Accordingly, that dimension is the maximum length of the cutoff section when .050 inch spheres are employed.

As is indicated in the coupling equation, the coupling between spheres is dependent upon the center to separation of the spheres and is subtsantially independent of the sphere size. Logically, a sphere that experiences a minimum of RF and DC field nonuniformities should be selected and, accordingly, should be of the smallest practical size. YIG spheres presently are available in diameters of between .010 to .100 inch. In practice, other considerations influence the selection of the sphere diameter. One factor is the RF coupling structure. The RF coupling structure preferably should have a minimum dimension in the direction of the applied magnetic field, H*dc*, polarizing the spheres in order to preserve the linear tuning characteristics of the electromagnet and to keep the tuning power to a minimum.

In the waveguide model of FIG. 1, it is necessary to reduce the *b* (waveguide) dimension from .311 inch to .078 inch. This is a 4 to 1 reduction in the *b* dimension from the *b* dimension of a standard waveguide normally specified for the 12 to 18 gigahertz waveguide band. The .078 inch dimension is the inside dimension of the waveguide. The addition of a .020 inch thickness to each side of the waveguide, such as due to the thickness of the waveguide walls, results in an outside dimension for the waveguide of .118 inch. In using an electromagnet with pole pieces that abut the side wall of the waveguide the distance between the confronting pole pieces faces of the electromagnetic and, hence, the air gap is thus .118 inch.

An additional factor in selecting a sphere size are the spurious responses, In order to avoid excess spurious responses from the YIG spheres, it is necessary that the ratio of sphere size to inside wall dimensions be greater than 1.5 to 1. In the example given, the maximum sphere diameter is accordingly .060 inch.

In operation, bias source 29 provides a series of DC pulses which energizes diode 20. The diode generates a spectrum of electromagnetic energy in which the desired frequency, *f*, is dominant, which appears in the front portion of the container. Suitable direct current is provided by current source 47 to electromagnet 44 which produces DC magnetic fields, proportional in magnitude to the current, which polarize YIG spheres 36 and 38, respectively, As previously discussed, the YIG spheres biased with a magnetic field effectively acts as a resonant tank circuit and are resonant at a frequency which is determined generally in accordance with the equation $fr=Hdc$. In the particular example given, the current is chosen so that $f_r$ is within the selected range of 12 to 18 gHz. Accordingly, YIG sphere 36 acts as a resonant element which interacts with the electromagnetic fields from the diode and essentially is coupled electromagnetically to diode 20.

As is conventional, those oscillations at the frequency of the tuned circuit predominate; in this instance the tuned circuit being YIG sphere 36. However, in order to maintain oscillation from the LSA type diode 20, the diode must be coupled to or "see" a resistive load. This phenomenon or requirement for LSA diodes is well known and noted in the literature. Resistive load 14 is coupled to diode 20 by means of a transmission line 16, waveguide flange 12, impedance transformer 18, the back end of the container, and waveguide cutoff section 35 in the container to the diode.

As is well known, a magnetically polarized and resonant YIG sphere operates to rotate by 90° the component H in an electromagnetic wave of the frequency $f_r$ which is perpendicular to the direction of the polarizing or biasing magnetic field. Since the frequencies of the microwaves that are appearing at the input of waveguide cutoff section 35 are below cutoff frequency of that waveguide section, under ordinary circumstances none of this energy is propagated through the waveguide. However, the waveguide cutoff section contains a polarized (and resonant) YIG sphere 36 which rotates the polarization of the magnetic components H of the electromagnetic fields of the frequency $f_r$ to which the YIG sphere is tuned. The ordinary concepts of the waveguide "cutoff" appear to no longer be applicable to microwaves at that frequency. For frequencies other than $f_r$ the cutoff section 35 does, however, continue to "cutoff" in accordance with waveguide theory.

Sphere 36 rotates by 90° the magnetic components of the input fields and this modified electromagnetic field propagates down the waveguide cutoff section 35 to the output in what has been termed a "ferrite guided mode" for lack of a better explanation. This phenomenon has not been theoretically explained fully and little information concerning same is available in the literature. However, it is explained somewhat by the article authored by Mr. Harold Seidel in an article appearing in The Proceedings of the IRE, vol. 44, No. 10, October 1956, pages 1410 through 1414. Accordingly, it may be stated that the characteristics of the electromagnetic fields at the frequency to which YIG sphere 36 is tuned are placed in such form as to permit them to propagate through the cutoff section 35.

The second YIG sphere 38, located at the output end of waveguide cutoff section 35, similarly is magnetically polarized from the DC magnetic field generated by electromagnet 44. Accordingly, sphere 38 in like manner and due to its gyromagnetic properties rotates again by 90° the polarization of those components of the magnetic field in the electromagnetic field of the frequency $f_r$ transmitted from the input cutoff section 35. This places the magnetic component electromagnetic field at the cutoff section output theoretically in a polarization which is the same as the input rotated by approximately 180°. Accordingly, frequencies which are of the same frequency to which the YIG spheres 36 and 38 are tuned are permitted to pass through waveguide cutoff section 35, to the waveguide transmission line and to load 14. Likewise, microwave energy of frequency $f_r$ may be reflected from load 14, passes back through cutoff section 35 to diode 20, while microwave energy of other frequencies are not. Accordingly, diode 20 is coupled both to a resistive load and to a resonant tank circuit, conditions necessary for the maintenance of oscillation.

It is noted that single crystal YIG spheres have a very sharp frequency dropoff characteristic; that is, they do not interact or resonate at frequencies outside of a very well defined band of frequencies about the one to which it is tuned. Accordingly, if an adjacent or spurious signal is presented at the input of waveguide cutoff section 35, it does not undergo the gyromagnetic modification of its characteristics, and those adjacent frequencies simply "see" the input of a waveguide which is to them below cutoff. Accordingly, those adjacent frequencies cannot propagate through the cutoff section and the ordinary rule of "cutoff" waveguides is applicable. Thus, substantially the only frequency which passes through the cutoff section to the load is simply that frequency to which YIG spheres 36 and 38 are tuned.

As is apparent, this provides a substantial filtering action in the oscillator and results in an oscillator output signal to the load of the desired frequency of high spectral purity. The wide spectrum of frequencies actually generated by diode 20 are simply prevented from passing to load 14. In like manner, should any spurious signals in the range of frequencies below the cutoff frequency of the waveguide cutoff section appear from the load through waveguide 16, flange 12, transformer 18 into the container, the aforedescribed filtering action prevents those spurious frequencies from passing back through the cutoff section 35 to the front of the container in which diode 20 is located and where it might interfere or adversely influence the performance of diode 20. There results thusly a high degree of isolation between the diode 20 and load 14.

Additionally, the current through electromagnet 44 is varied with conventional control circuitry in any manner to vary the magnetic field, H*dc*, applied to the YIG spheres. Accordingly, the frequency of resonance of the respective YIG spheres 36 and 38 is changed, and hence the frequency of the oscillator is varied. In accordance with the preceding example, the YIG spheres may be tuned by way of the magnetic field to frequencies within a band of 12 to 18 gigahertz. Thus, the oscillator is electrically tuned avoiding many of the complications inherent in mechanically tuning a microwave cavity.

Figure 3:
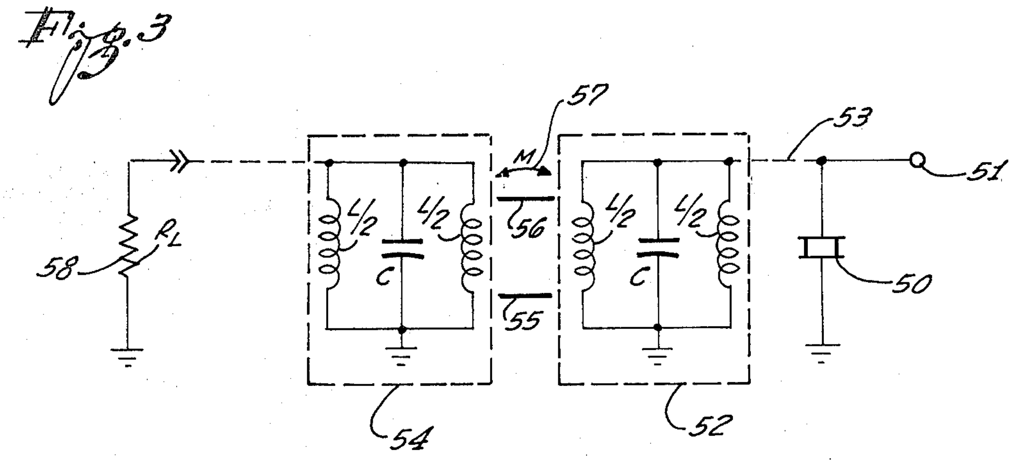
FIG. 3 represents schematically the electrical equivalent circuit of the oscillator of the present invention; and, FIG. 4 schematically illustrates a second embodiment of the invention suitable for use with a coaxial output.

A schematic equivalent circuit diagram is illustrated in FIG. 3. The LSA diode is represented as 50 connected between a terminal 51 and ground. The DC bias supply, not illustrated, is coupled to terminal 51. The parallel circuit enclosed within dashed lines 52, consisting of two inductors L/2 each connected in parallel with a capacitance C, represents the equivalent resonant circuit of YIG sphere 36 of FIG. 1.

The coupling between the output of the diode 50 and L-C circuit 52 is an electromagnetic field coupling and is illustrated by dashed line 53. The YIG sphere 38 of FIG. 1 is illustrated by dashed line 54. The YIG is illustrated as an equivalent resonant L-C electrical circuit by the dashed lines 54, and consists of the same parallel inductances and capacitance. The coupling between the circuits 52 and 54 includes the transmission path between the two YIG spheres by means of the cutoff section. This coupling is represented by lines 55 and 56. In addition to coupling by the cutoff section, the inductive coupling directly between the two YIG spheres by means of mutual inductance, M, is represented by the arrow 57 in the figure. And, the output of L-C circuit 54 is coupled by the transmission lines to load resistance, R*l*, element 58.

Figure 4:
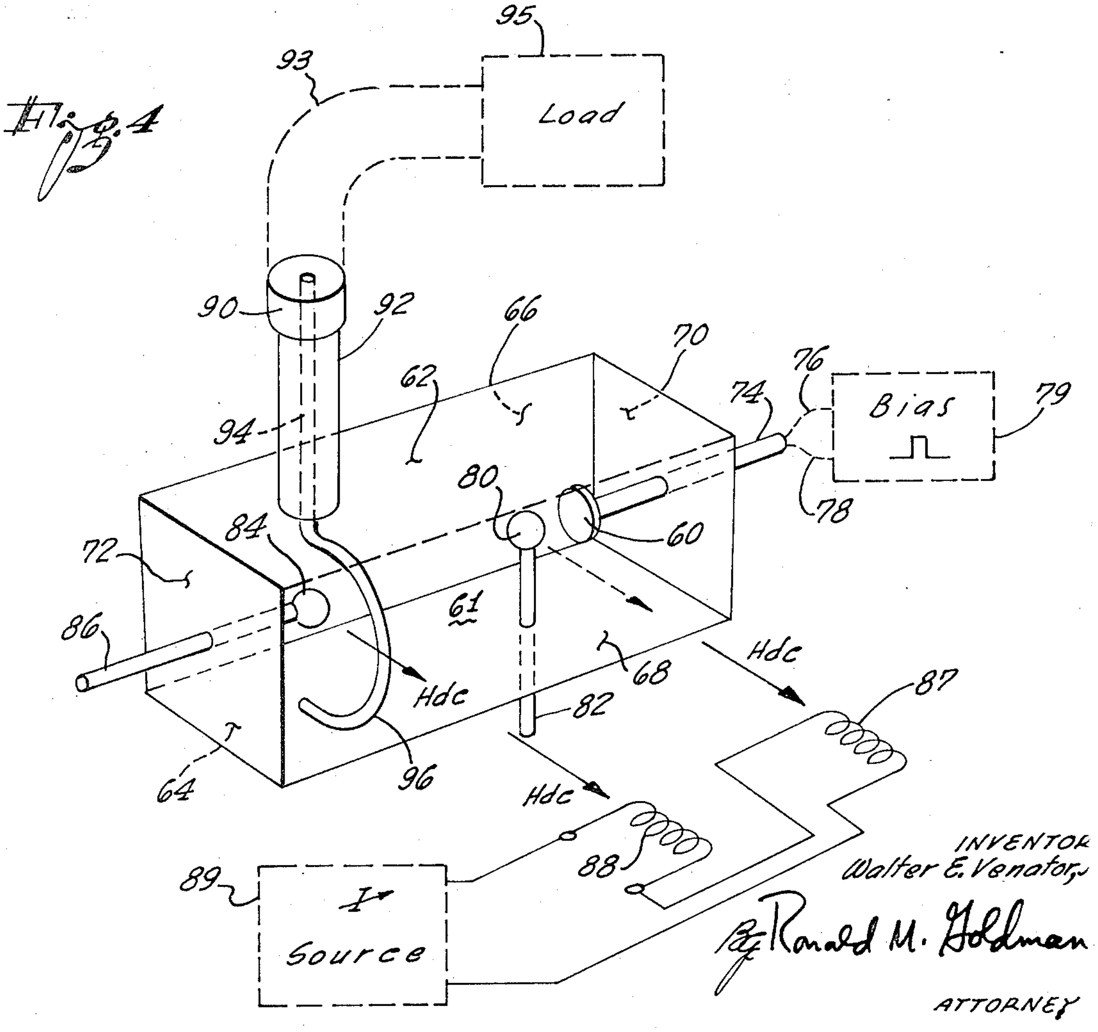

Reference is now made to FIG. 4 which illustrates another embodiment of the invention suitable for connection to a coaxial line in contrast to the waveguide embodiment of FIG. 1. In FIG. 4 an LSA diode 60 is mounted within a waveguide, the entire length of which is a waveguide cutoff section, as described earlier with respect to FIG. 1. Accordingly, the same design considerations discussed for the waveguide cutoff section with respect to dimensions, etc. are applicable in this embodiment. This waveguide section 61 is formed of top and bottom walls 62 and 64, a back wall 66, a front wall 68, and two side walls 70 and 72. For purposes of better illustrating the invention, the top and front walls are treated as being transparent. However, all walls are of electrically conductive material.

Diode 60 is mounted on an insulating post 74. Post 74 extends through the conductive walls of the waveguide and contains leads 76 and 78. Leads 76 and 78 provide for electrical connection of the terminals of diode 60 to a suitable source of DC pulses from a conventional supply symbolically illustrated as 79. A YIG sphere 80 is located within the waveguide a distance of approximately ¼ wavelength from diode 60 (at the center frequency for which the oscillator is designed), and is supported centrally therein by a post 82 of insulating material.

A second YIG sphere 84 is mounted at the other or output end of the waveguide section by means of an insulator post 86 which extends through wall 72. Each of posts 82 and 86 is longitudinally and rotationally adjustable, and provide rotation in order to cancel anisotropic effects and make resonant frequency of both spheres common.

Electrical coils or electromagnets 87 and 88 are provided for establishing magnetic fields, H*dc*, perpendicular to the front walls which magnetically polarize the YIG spheres. The coils, as in FIG. 1, are connected to a suitable source of current 89 which may be adjustable or variable in order to adjust or vary the intensity of the magnetic fields and hence vary the frequency of resonance of the respective YIG spheres. It is noted that a single electromagnet may be used in place of the two illustrated in this figure. A coaxial output connection is provided which has an output connector 90, an outer conductor 92, and an inner conductor 94. A suitable coaxial line 93, illustrates symbolically, connects the output to a suitable resistive load 95.

A coupling loop 96 lies in a single plane and extends from the entrance of center conductor 94 of the coaxial line around in a loop to a position contacting the bottom wall 72 of the waveguide.

The operation of the embodiment of FIG. 4 is essentially the same as that described with respect to the embodiment illustrated in FIG. 1. Accordingly, with respect to same, reference is made to the discussion accompanying FIG. 1 for explanation. The only difference in the operation of substantial note is the manner in which the microwave energy from the waveguide cutoff section 61 output is coupled to the coaxial line 92 and 94 and this is by a conventional coupling loop.

It is to be understood that the above described arrangements are intended to be illustrative of the application of the principles of the invention since numerous other arrangements and equivalents suggest themselves to those skilled in the art which do not depart from the spirit and scope of the invention.

Accordingly, it is to be expressly understood that the invention is to be broadly construed within the spirit and scope of the appended claims.

What is claimed is:

1. A microwave oscillator comprising:

(a) an electromagnetic energy radiating breakdown diode for generating electromagnetic energy of a frequency, *f*, and maintaining such generation at said frequency in dependence upon there being coupled thereto resistor means having a resonant frequency, *f*, and resistive load means;

(b) a waveguide cutoff section having:

(bi) an input end, (bii) an output end, and a (biii) cutoff frequency $f_c$, where the cutoff frequency $f_c$ is higher than *f*;

(c) resistive load means coupled to said waveguide section output;

(d) first gyromagnetic means electromagnetically coupled to said diode generator and said waveguide input for providing electromagnetic resonance characteristic at said frequency *f* and for gyromagnetically modifying the characteristics of electromagnetic radiation of frequency *f* coupled from said diode generator into a form so that said radiation propagates through said waveguide even though the frequency, *f*, thereof is below $f_c$;

(di) said gyromagnetic means having a frequency of resonance, *f*, where *f* equals $\gamma H_{dc}$, where $\gamma$ is defined as the gyromagnetic ratio of the gyromagnetic material, and H*dc* is defined as the level of an applied magnetic polarizing field;

(e) and, magnetic field means including means for applying a polarizing magnetic field H*dc* to said first gyromagnetic means.

2. The microwave oscillator as defined in claim 1 further comprising:

(f) second gyromagnetic means, said second gyromagnetic means being electromagnetically coupled to said waveguide output for gyromagnetically modifying the characteristics of electromagnetic radiation of frequency *f* passing through said waveguide and for preventing entrance into said waveguide from said output end of electromagnetic radiation of frequencies below $f_c$ and other than *f*;

said gyromagnetic means having a frequency of resonance, *f*, where *f* equals substantially $\gamma H_{dc}$; and (g) wherein said magnetic field means includes means for applying a polarizing magnetic field H*dc* to said second gyromagnetic means.

3. The invention as defined in claim 2 including:

(h) means for varying said magnetic field H*dc* in order to tune the resonant frequency *f* of said first and second gyromagnetic means to different frequencies over a range of frequencies.

4. The invention as defined in claim 1 wherein said first gyromagnetic means comprises a single crystal yttrium iron garnet (YIG) sphere.

5. The invention as defined in claim 2 wherein each of said first and second gyromagnetic means comprises a single crystal yttrium iron garnet (YIG) sphere.

6. A microwave oscillator comprising: an LSA breakdown diode for generating microwave energy of a frequency including, $f$; a resistive load; a waveguide cutoff section having an input end for receiving microwave energy from said diode, and an output end for coupling to said resistive load, said waveguide cutoff section having a cutoff frequency $f_c$ where $f_c$ is higher than $f$; a first YIG sphere located in said section proximate said input end; a second YIG sphere located in said section proximate said output end; and magnetic field means for biasing magnetically said first and second YIG spheres for resonance at said frequency $f$.

7. A microwave filter for passing microwave energy of a frequency $f$ and preventing the passage of microwave frequencies other than those in a narrow band of frequencies around frequency $f$, comprising: a waveguide having an input end, an output end, and a cutoff frequency $f_c$, where $f_c$ is higher than $f$; a first single crystal yttrium iron garnet sphere mounted in said waveguide proximate said input end; a second single crystal yttrium iron garnet sphere mounted in said waveguide proximate said output end; each of said first and second YIG spheres exhibiting resonance at a frequency, $f$, where $f$ equals $\gamma$ H$dc$ and where $\gamma$ is defined as the gyromagnetic ratio of the YIG material and H$dc$ is defined as the level of an applied magnetic polarizing field; and magnetic field means for applying a properly oriented polarizing magnetic field of intensity H$dc$ to said first and second YIG spheres.

8. The microwave filter defined in claim 7 further comprising: means to vary the intensity of said magnetic field whereby the bandpass characteristics of said filter may be changed.

9. A microwave oscillator comprising: a waveguide section means having an input end, an output end, and a cutoff frequency $f_c$, first gyromagnetic means located in said waveguide section means proximate said input end, second gyromagnetic means spaced from said first gyromagnetic means and located in said waveguide section means proximate said output end; magnetic field means for polarizing magnetically said first and second gyromagnetic means for causing said gyromagnetic means to be resonant at a frequency $f$, where $f$ is lower than said cutoff frequency $f_c$; breakdown diode means for generating microwave energy in a frequency range including said frequency $f$, coupled to the input of said waveguide and; resistive load means coupled to the output of said waveguide.

10. The invention as defined in claim 9 wherein said magnetic field means is adjustable, whereby the frequency of oscillation of the oscillator thereby defined is changeable.

11. The invention as defined in claim 10 wherein each of said first and second gyromagnetic means comprises a single crystal YIG sphere.

12. The invention as defined in claim 11 wherein said breakdown diode means comprises a limited space charge accumulation diode.

References Cited

N. S. Chang, "YIG-Tuned Gunn Effect Oscillator," Proc. IEEE (Letters), vol. 55, p. 1621, September 1967.

M. Dybyk "Ferromagnetically Tunable Gunn Effect Oscillator," Proc. IEEE (Letters), pp. 1363–64, August 1968.

JOHN KOMINSKI, Primary Examiner

U.S. Cl. X.R.

317—234

UNITED STATES PATENT OFFICE

CERTIFICATE OF CORRECTION

Patent No. 3,544,918 Dated December 1, 1970

Inventor(s) Walter E. Venator, Jr.

It is certified that error appears in the above-identified patent and that said Letters Patent are hereby corrected as shown below:

Column 10, line 27, "resistor" should read -- resinato --; lines 38 and 39, "characteristic" should read -- characteristics --.

Signed and sealed this 27th day of April 1971.

(SEAL)
Attest:

EDWARD M.FLETCHER,JR.
Attesting Officer

WILLIAM E. SCHUYLER,
Commissioner of Paten